US012653752B2

(12) United States Patent
Liu et al.

(10) Patent No.: US 12,653,752 B2
(45) Date of Patent: Jun. 16, 2026

(54) SEXUAL STIMULATION APPARATUS AND CONTROL METHOD THEREOF, AND COMMUNICATION SYSTEM

(71) Applicant: HYTTO PTE. LTD., Singapore (SG)

(72) Inventors: Dan Liu, Guangzhou (CN); Jilin Qiu, Guangzhou (CN)

(73) Assignee: HYTTO PTE. LTD., Singapore (SG)

(*) Notice: Subject to any disclaimer, the term of this patent is extended or adjusted under 35 U.S.C. 154(b) by 973 days.

(21) Appl. No.: 17/820,579

(22) Filed: Aug. 18, 2022

(65) Prior Publication Data

US 2024/0058205 A1 Feb. 22, 2024

(51) Int. Cl.
*A61H 19/00* (2006.01)

(52) U.S. Cl.
CPC ..... *A61H 19/40* (2013.01); *A61H 2201/1215* (2013.01); *A61H 2201/1664* (2013.01)

(58) Field of Classification Search
None
See application file for complete search history.

(56) References Cited

U.S. PATENT DOCUMENTS

| | | | | |
|---|---|---|---|---|
| 8,747,337 | B2 | 6/2014 | Lee | |
| 2017/0239134 | A1 | 8/2017 | Rossi | |
| 2018/0140502 | A1* | 5/2018 | Shahoian | A61H 19/44 |
| 2022/0323292 | A1* | 10/2022 | Sloan | A61H 7/005 |

FOREIGN PATENT DOCUMENTS

| | | | | |
|---|---|---|---|---|
| EP | 2364687 | B1 | 8/2013 | |
| WO | WO-2015077909 | A1 * | 6/2015 | A61H 19/44 |

* cited by examiner

*Primary Examiner* — Thaddeus B Cox
(74) *Attorney, Agent, or Firm* — Qinghong Xu

(57) ABSTRACT

Disclosed is a sexual stimulation apparatus including: a chassis comprising a sensing stopper component; a moving component moveable relative to the chassis and having a sensing element; a controller configured to receive signals generated when the sensing element enters a sensing range of each of the sensing stopper component, and transmit drive signal to the driver; a driver configured to drive the moving component to perform linear reciprocating motion according to the drive signal; and a moving rod connected to the moving component and is configured to move with the moving component, wherein the moving rod includes an end to which an adult toy is attachable, to allow the adult toy to perform linear reciprocating motion with the moving rod. Also disclosed is a method for controlling the sexual stimulation apparatus and a communication system.

20 Claims, 5 Drawing Sheets

SEXUAL STIMULATION APPARATUS AND CONTROL METHOD THEREOF, AND COMMUNICATION SYSTEM

TECHNICAL FIELD

The present disclosure relates to the field of adult toy, and in particular, to a sexual stimulation apparatus and control method thereof, and communication system.

BACKGROUND

Sexual stimulation apparatus is a kind of adult toy, which includes objects or devices that are primarily used to facilitate human sexual pleasure and typically to date have been designed to resemble human genitals, albeit perhaps in an abstracted form at times.

In the related art, the user is required to hold the sexual stimulation apparatus by hand while using the sexual stimulation apparatus, to keep the sexual stimulation apparatus in a suitable position for stimulation. Also, in some cases the user is required to drive the sexual stimulation apparatus by hand to achieve the stimulation effect. The user may feel cumbersome due to these operations and cannot perform other activities while using the sexual stimulation apparatus.

It should be noted that, information disclosed in the above background portion is provided only for better understanding of the background of the present disclosure, and thus it may contain information that does not form the prior art known by those ordinary skilled in the art.

SUMMARY

The present disclosure provides a sexual stimulation apparatus and control method thereof, and communication system for inducing sexual stimulation to users.

According to one aspect, the present disclosure provides a sexual stimulation apparatus including: a chassis including a sensing stopper component; a moving component moveable relative to the chassis and having a sensing element; a controller configured to receive signals generated when the sensing element enters a sensing range of each of the sensing stopper component, and generate a drive signal; a driver configured to drive the moving component to perform linear reciprocating motion according to the drive signal; a moving rod connected to the moving component and is configured to move with the moving component, wherein the moving rod includes an end to which an adult toy is attachable, to allow the adult toy to perform linear reciprocating motion with the moving rod.

According to some embodiments, the moving component includes: a rotating component connected to the driver and configured to rotate according to the driver; and a sliding component, engaged to the rotating component and configured to perform linear movement when the rotating component is rotated, wherein the moving rod is connected to the sliding component, and the sensing element is disposed on the sliding component.

According to some embodiments, the rotating component includes a driver fixing seat, a screw rod and a screw rod fixing seat arranged in sequence along a longitudinal direction of the chassis, wherein the driver is disposed on a first side of the driver fixing seat, and the screw rod and the screw rod fixing seat is disposed on a second side of the driver fixing seat opposite to the first side, wherein a first end of the screw rod is rotatably connected with the driver, and a second end of the screw rod is rotatably connected with the screw rod fixing seat, and wherein the sliding component is engaged to the screw rod.

According to some embodiments, the sliding component includes: a screw sleeve engaged to the screw rod; and a sensing plate attached to the screw sleeve, wherein the sensing element is disposed on the sensing plate at a side opposite to the sensing stopper component, and wherein the sensing plate is connected to the moving rod.

According to some embodiments, the sliding component includes: a guide fixing seat disposed on the chassis; a guide rod fixed to the guide fixing seat and extended along the longitudinal direction; and a slider sleeved to the guide rod and moveable along the guide rod, wherein, the sensing plate is fixed to the slider, and the moving rod is connected to the slider.

According to some embodiments, the sensing plate includes a connecting fin extending in parallel with a moving plane of the slider, and wherein the sensing plate is attached to the slider by the connecting fin.

According to some embodiments, the sensing plate includes a sensing fin extending in parallel with the sensing stopper component, and wherein the sensing element is disposed on a side of the sensing fin opposite to the sensing stopper component.

According to some embodiments, the guide fixing seat includes a through hole extending along the longitudinal direction, and wherein the moving rod is configured to pass through the through hole.

According to some embodiments, the sexual stimulation apparatus further includes an opposite moving rod, the opposite moving rod is connected to the slider at a side opposite to the moving rod.

According to some embodiments, the chassis includes a limit structure having a through hole, and the moving rod is configured to pass through the through hole.

According to some embodiments, the sensing stopper component includes at least two sensing switches configured to limit a stroke of the moving component, and wherein the at least two sensing switches are integrated or separated.

According to some embodiments, the sensing stopper component further includes a switch seat, and wherein each of the at least two sensing switches is disposed on a side of the switch seat opposite to the sensing element.

According to some embodiments, the sexual stimulation apparatus further includes an adapter connected to the moving rod, wherein the adult toy is connected to the adapter.

According to some embodiments, the adapter includes: a first body and a second body configured to hold the adult toy; a connector disposed on the first body or the second body, wherein the connector is detachably connected to the moving rod; a spring disposed between the first body and the second body; a quick release member configured to pass through the first body and the second body, wherein the spring is in a compressed state when the first body and second body are fixed together by the quick release member.

According to some embodiments, the sexual stimulation apparatus further includes a housing configured to accommodate the moving component and the sensing stopper component, wherein the housing includes a through hole and the moving rod is protruded from the through hole, and wherein housing is disposed on a supporter to stabilize the sexual stimulation apparatus and adjust an orientation of the adult toy.

According to another aspect, the present disclosure further provides a communication system including: the sexual stimulation apparatus according to the above aspect, configured to receive a control signal; and at least one communication device communicated with the sexual stimulation apparatus to transmit the control signal, wherein the sexual stimulation apparatus is configured to operate according to the control signal.

According to some embodiments, the communication system further includes a live broadcast room, wherein the at least one communication device includes a model device and a guest device configured to interact through the live broadcast room, and wherein the guest device is configured to send control request to the model device through the live broadcast room, and the model device is configured to transmit the control signal to the sexual stimulation apparatus.

According to some embodiments, the live broadcast room is configured to receive tip information from the guest device and forward the tip information to the model device, and wherein the model device is further configured to generate the control signal according to the tip information.

According to another aspect, the present disclosure further provides a method for controlling the sexual stimulation apparatus according to the above aspect, including: activating a communication between the sexual stimulation apparatus and a communication device; receiving, by the sexual stimulation apparatus, control signal from the communication device; and controlling, by the sexual stimulation apparatus, the moving component to perform linear reciprocating motion to drive the adult toy to perform linear reciprocating motion.

According to some embodiments, the control signal includes frequency information and amplitude information, and the method further includes: controlling, by the sexual stimulation apparatus, the moving component to perform linear reciprocating motion according to the frequency information and amplitude information.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings are enclosed to provide a further understanding of the present disclosure and constitute a part of the specification, and together with the following detailed description, to serve for explanation of the present disclosure. But the accompanying drawings are not to be construed as limiting the present disclosure. In the drawings.

In order to more clearly illustrate the technical solutions of the embodiments of the present disclosure, drawings of the embodiments of the present disclosure will be briefly described below. It will be apparent that the drawings in the following description refer only to some embodiments of the present disclosure, and are not intended to limit the present disclosure.

DETAILED DESCRIPTION

Figure 1:
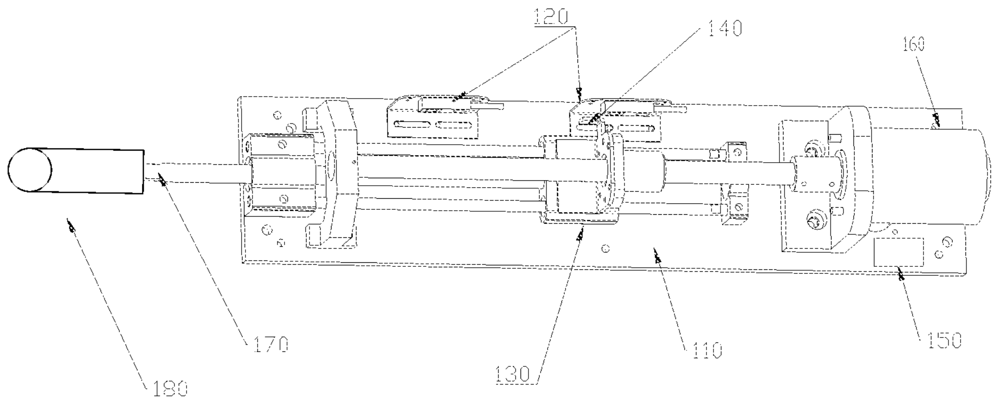
FIG. 1 illustrates a schematic structure diagram of the sexual stimulation apparatus according an embodiment of the present disclosure.

Hereinafter, the sexual stimulation apparatus according to the present disclosure will be described in further detail with reference to the accompanying drawings and particular embodiments of the present disclosure, such that those skilled in the art may have a better understanding of technical solutions of the present disclosure.

In order to make the objectives, technical solutions and advantages of the embodiments of the present disclosure more clear, the technical solutions of the embodiments of the present disclosure will be described clearly and completely in conjunction with the accompanying drawings of the embodiments of the present disclosure. It is obvious that the described embodiments are part of the embodiments rather than all embodiments of the present disclosure. All other embodiments obtained by one of ordinary skill in the art based on the described embodiments of the present disclosure without the need for creative work are within the scope of the present disclosure.

In the description of the embodiments of the present disclosure, it is to be noted that the directional or positional relationships indicated by the terms "upper", "lower", "top", "bottom" or the like are based on the directional or positional relationships shown in the drawings, which are provided only for the purpose of facilitating the description and simplification of the description and is not intended or implied that the device or element referred to must have a specific orientation, constructed or operated in a particular orientation. Accordingly, it should not be construed as a limitation of this disclosure.

Figure 2A:
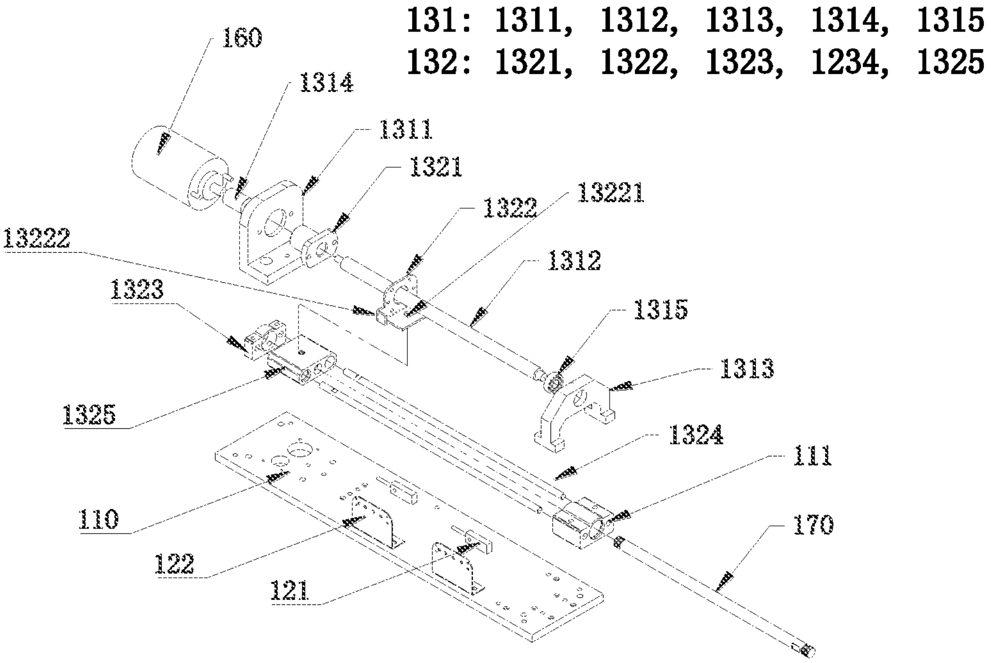
FIG. 2A illustrates an exploded view of the sexual stimulation apparatus according an embodiment of the present disclosure.
Figure 2B:
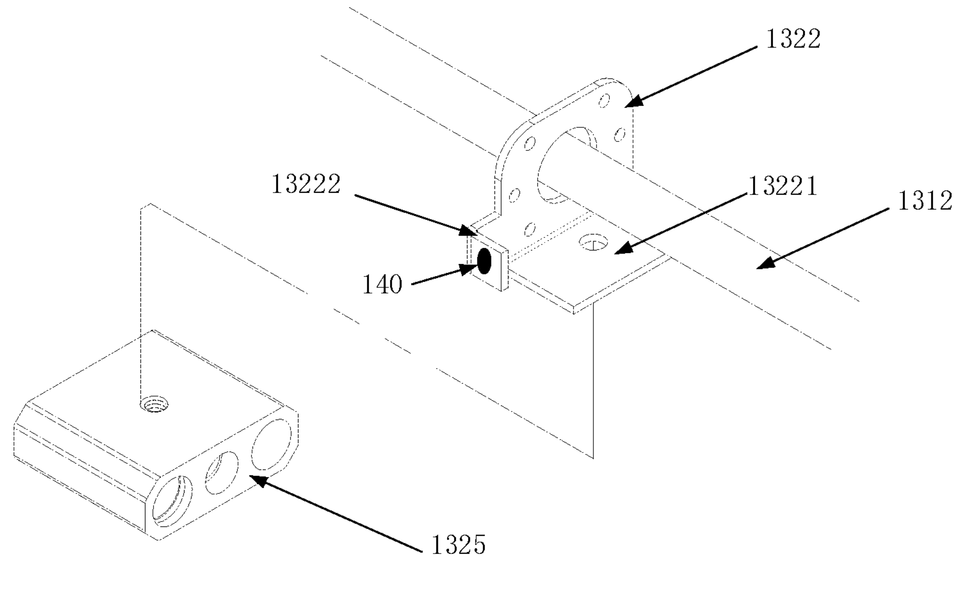
FIG. 2B illustrates schematic structure diagram of the sensing plate of the sexual stimulation apparatus according an embodiment of the present disclosure.

FIG. 1 illustrates a schematic structure diagram of the sexual stimulation apparatus according an embodiment of the present disclosure, and FIG. 2A illustrates an exploded view of the sexual stimulation apparatus according an embodiment of the present disclosure. According to the present embodiment, the sexual stimulation apparatus may include a moving component configured to perform linear reciprocating motion along a longitudinal direction, a moving rod is connected to the moving component and having a free end connected thereto an adult toy. With such a configuration, when the moving component is performing linear reciprocating motion along the longitudinal direction, the adult toy will move along with the moving component to induce sexual stimulation to the users. As shown in FIGS. 1 and 2, the sexual stimulation apparatus according to an embodiment of the present disclosure includes: a chassis 110 including a sensing stopper 120 component; a moving component 130 moveable relative to the chassis 110 and having a sensing element 140; a controller 150 configured to receive signals generated when the sensing element 140 enters a sensing range of either one of the sensing stopper component 120, and generate a drive signal; a driver 160 configured to drive the moving component 130 to perform linear reciprocating motion according to the drive signal; a moving rod 170 connected to the moving component 130 and is configured to move with the moving component 130 to perform linear reciprocating motion. The moving rod 170 includes an end to which an adult toy is attachable, to allow the adult toy to perform linear reciprocating motion with the moving rod. According to some implementations, when the sensing element 140 enters the sensing range of either one of the sensing stopper component 120, a sensing signal may be generated by the sensing element 140, and the sensing element 140 may transmit the signal to the controller 150. In other implementations, when the sensing element 140 enters the sensing range of either one of the sensing stopper component 120, a sensing signal may be generated by the sensing stopper component 120, and the sensing stopper component 120 may transmit the signal to the controller 150. The drive signal may include a control signal for controlling the moving direction of the moving component 130.

According to the embodiment of the present disclosure, when the sexual stimulation apparatus is operating, the driver 160 drives the moving component 130 to perform linear motion. In some embodiments, the driver 160 may change the linear motion of the moving component into opposite directions, thereby driving the moving component 130 to perform linear reciprocating motion. That is, the moving component 130 may move forward along a longitudinal direction of the chassis 110, and the sensing element 140 will move along with the moving component 130 in the same direction. When the sensing element 140 enters the sensing range of the sensing stopper component 120, the drive signal is generated by the controller 150, and the driver 160, upon receiving the drive signal, drives the moving component 130 in an opposite direction, such that the moving component 130 performs the linear reciprocating motion. Accordingly, the adult toy 180 connected to the moving rod 170 which is connected to the moving component 130, is driven to perform linear reciprocating motion along the longitudinal direction of the chassis 110. According to this embodiment, the moving component 130 is driven by the driver 160 according to the drive signal generated when the sensing element 140 enters the sensing range of the sensing stopper component 120, and thus the sexual stimulation apparatus operates in a more effective way. Also, the adult toy 180 can be held by the sexual stimulation apparatus, and thus it is unnecessary for the user to hold the adult toy 180 when using the toy. In this embodiment, the controller 150 and the driver 160 are described as separate elements, while in some other implementations, the controller 150 and the driver 160 may be implemented by one element, e.g., a digital processor, or an integrated circuit (IC) or other logical circuit.

According to some embodiments, the moving component 130 may include: a rotating component 131 connected to the driver 160 and configured to rotate according to the driver; and a sliding component 132, engaged to the rotating component 131 and configured to perform linear movement when the rotating component 131 is rotated, wherein the moving rod 170 is connected to the sliding component 132, and the sensing element 140 is disposed on the sliding component 132.

As shown in FIG. 2A, the rotating component 131 may include a driver fixing seat 1311, a screw rod 1312 and a screw rod fixing seat 1313 arranged in sequence along the longitudinal direction of the chassis 110. The driver 160 is disposed on a first side of the driver fixing seat 1311, and the screw rod 1312 and the screw rod fixing seat 1313 is disposed on a second side of the driver fixing seat 1311 opposite to the first side. A first end of the screw rod 1312 is rotatably connected with the driver, and a second end of the screw rod 1312 is rotatably connected with the screw rod fixing seat 1313, and wherein the sliding component 132 is engaged to the screw rod 1312.

In this embodiment, the driver fixing seat 1311 and the screw rod fixing seat 1313 may be attached to the chassis 110. The driver 160 may be fixed to the driver fixing seat 1311, and the driving shaft of the driver is connected to the screw rod 1312 via a shaft connector 1314 passing through a via hole formed in the driver fixing seat 1311. Also, the two ends of the screw rod 1312 are rotatably connected with the driver fixing seat 1311 and the screw rod fixing seat 1313, and a connecting element, such as a bearing 1315 may be provided in the via holes formed in the driver fixing seat 1311 and the screw rod fixing seat 1313, such that the screw rod 1312 is rotatable with respect to the seats while is maintained in position.

According to some embodiments, the sliding component 132 may include: a screw sleeve 1321 engaged to the screw rod 1312; and a sensing plate 1322 attached to the screw sleeve 1321, wherein the sensing element 140 is disposed on the sensing plate 1322 at a side opposite to the sensing stopper component 120, and wherein the sensing plate 1322 is connected to the moving rod 170. In this embodiment, the screw sleeve 1321 may be engaged to the screw rod 1312 by thread engagement. In particular, the sleeve 1321 and the screw rod 1312 may have screws that matches with each other, such that the screw sleeve 1321 may move along the screwed region of the screw rod 1312.

In some embodiment, the sensing plate 1322 is disposed vertical to the screw rod 1312, and the sensing plate 1322 has a via hole through which the screw rod 1312 is inserted, as shown in FIG. 2A. However, in other embodiments, the sensing plate 1322 is detachable to the screw sleeve 1321, that is, the sensing plate 1322 is mounted to the screw sleeve 1321 with a detachable means, to allow easy separation of the sensing plate 1322 and the screw sleeve 1321. Moreover, the sensing plate 1322 is illustrated with a via hole through which the screw rod 1312 is inserted, while the present disclosure is not limited thereto. In other embodiments, the sensing plate 1322 can be attached to the screw sleeve 1321 at a position under the screw rod 1312.

According to some embodiments, the sliding component 132 may include: a guide fixing seat 1323 disposed on the chassis 110; a guide rod 1324 fixed to the guide fixing seat 1323 and extended along the longitudinal direction; and a slider 1325 sleeved to the guide rod 1324 and moveable along the guide rod 1324. The sensing plate 1322 is fixed to the slider 1325, and the moving rod is connected to the slider 1325.

In this embodiment, the screw sleeve 1321 engaged to the screw rod 1312, and thus when the screw rod 1312 rotates according to the driver 160, the screw sleeve 1321 moves in the longitudinal direction along the screw rod 1312. Accordingly, when the screw sleeve 1321 performs linear reciprocating motion along the longitudinal direction of the chassis 110 according to the driver 160, the sensing plate 1322, the slider 1325 and the moving rod 170 connected directly or indirectly to the screw sleeve 1321 moves in the longitudinal direction and performs the same linear reciprocating motion. Therefore, the adult toy 180 connected to the moving rod 170 may perform the same linear reciprocating motion.

In this embodiment, the guide rod 1324 is fixed by the guide fixing seats 1323 which are fixed to the chassis 110, and the slider 1325 is sleeved to the guide rod 1324. Accordingly, the guide rod 1324 may guide the slider 1325 to move only along the guide rod 1324, and prevent the slider 1325 from moving in other direction, such as the circling motion along peripheral direction of the screw rod 1312. Accordingly, circling motion of the sensing plate 1322 and the screw sleeve 1321 can be prevented when they are connected to the slider.

According to some embodiments, the sensing plate 1322 may include a connecting fin 13221 extending in parallel with a moving plane of the slider 1325, and wherein the sensing plate 1322 is attached to the slider 1325 by the connecting fin 13221.

According to some embodiments, the sensing plate 1322 may include a sensing fin 13222 extending in parallel with the sensing stopper component 120. The sensing element 140 is disposed on a side of the sensing fin 13222 opposite to the sensing stopper component 120.

According to some embodiments, the guide fixing seat 1323 includes a through hole extending along the longitudinal direction, and wherein the moving rod 170 is configured to pass through the through hole.

According to some embodiments, the sexual stimulation apparatus further includes an opposite moving rod 171, the opposite moving rod 171 is connected to the slider 1325 at a side opposite to the moving rod 170.

According to some embodiments, the chassis 110 includes a limit structure 111 having a through hole, and the moving rod 170 is configured to pass through the through hole. Also, the guide rod 1324 may be fixed to the limit structure 111 to hole the guide rod 1324 in place.

According to some embodiments, the sensing stopper component 120 may include at least two sensing switches 121 configured to limit a stroke of the moving component 130, and wherein the at least two sensing switches 121 are integrated or separated.

In the embodiment shown in FIG. 2A, two sensing switches 121 are illustrated, which are arranged along the longitudinal direction of the chassis 110. Once the sensing element 140 is moved into the sensing range of either sensing switch 121, a drive signal is sent to the driver 160 to change the direction of the linear movement of the moving component 130. Accordingly, the stroke of the moving component 130 can be determined according to the positions of the sensing switches 121. The relative position between the two switches 121 may be adjustable such that different strokes of the moving component 130 can be achieved. Also, adjustment of the relative position of the sensing switches 121 may include manual adjustment or electrical adjustment. In the present disclosure, the manual adjustment may include moving the position of the sensing switches 121 manually, and the electrical adjustment may include moving the position of the sensing switches 121 according to the control signal for adjusting the amplitude of the sexual stimulation apparatus. It should be noted that although two sensing switches 121 are illustrated in this embodiment, other sensing switches 121 can be provided to generate drive signals to change the moving speed, moving acceleration or the like of the moving component 130. In the present embodiment, the sensing switch 121 may include a proximity switch such as a capacitive proximity switch, an inductive proximity switch, a hall proximity switch, a photoelectric proximity switch, or a truck proximity switches, and the sensing element 140 may include a metal piece that is sensible by the proximity switch.

According to some embodiments, the sensing stopper component 120 may further include a switch seat 122, and wherein each of the at least two sensing switches 121 is disposed on a side of the switch seat 122 opposite to the sensing element 140.

In this embodiment, the switch 122 may be fixed to the chassis 110, and thus when the sensing switch 121 is disposed on a side of the switch seat 122, the sensing switch 121 is held at a desire position, such that the sensing range thereof can be adjusted.

In some embodiment, the driver 160 may include a drive motor and an encoder, the encoder is configured to receive the control signal from the controller 150, and then convert it into a control command of the drive motor, and then send the control command to the drive motor to control the rotation direction (forward/backward) and rotation speed of the drive motor. When the drive motor rotates forward (e.g., clockwise), it drives the screw rod 1312 connected to the drive motor to rotate forward, and the screw sleeve 1321 sleeved on the screw rod 1312 converts the rotation of the screw rod 1312 into linear motion. As the drive motor rotating forward, the screw sleeve 1321 moves forward along the screw rod 1312, such that the sensing element 140 moves forward along with the screw sleeve 1321. When the sensing element 140 moves into the sensing range of the sensing stopper component 120, a first sensing signal is generated and transmitted to the encoder by the controller 150, and the encoder controls the drive motor to rotate backward. When the drive motor rotates backward (e.g., anti-clockwise), it drives the screw rod 1312 connected to the drive motor to rotate backward, and the screw sleeve 1321 sleeved on the screw rod 1312 converts the rotation of the screw rod 1312 into linear motion. As the drive motor rotating backward, the screw sleeve 1321 moves backward along the screw rod 1312, such that the sensing element 140 moves backward along with the screw sleeve 1321. When the sensing element 140 moves into the sensing range of the other sensing stopper component 120, a second sensing signal is generated and transmitted to the encoder by the controller 150, and the encoder controls the drive motor to rotate forward again, such that the screw sleeve 1321 and the sensing element 140 move forward again. The stroke of the moving rod 170, e.g., the telescopic range of the moving rod 170, can be controlled by adjusting the moving distance of the screw sleeve 1321 and the sensing element 140, which can be determined according to the distance between the sensing stopper component 120.

In some embodiments, the adult toy 180 may include a connection means connected to the moving rod 170. For example, a quick release connector may be provided in the adult toy 180. Accordingly, the adult toy 180 may be connected easily to the moving rod 170 and may be detached for cleaning or replacement easily. Other connection means will be possible according to the concept of the present disclosure, for example, a screw structure, a snap structure, an interlock structure or the like are also possible for the connection between the adult toy 180 and the moving rod 170.

Figure 3:
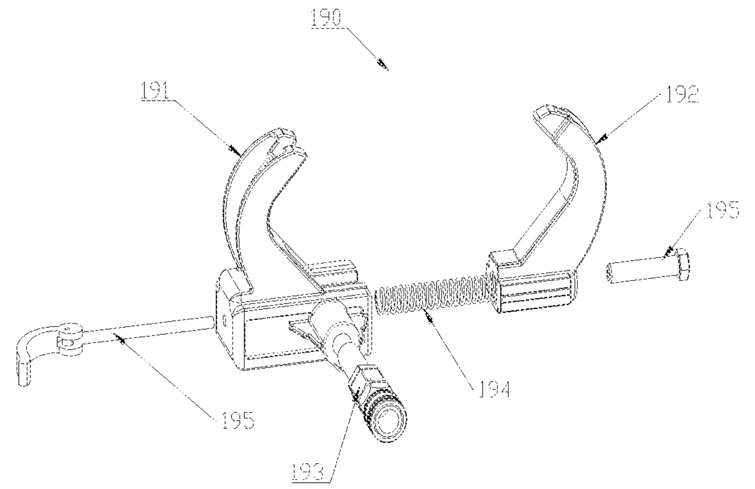
FIG. 3 illustrates a schematic structure diagram of the adapter of the sexual stimulation apparatus according an embodiment of the present disclosure.

Moreover, in other embodiments, the sexual stimulation apparatus may further include an adapter 190 connected to the moving rod 170, wherein the adult toy 180 is connected to the adapter 190. FIG. 3 illustrates a schematic structure diagram of an adapter of the sexual stimulation apparatus according an embodiment of the present disclosure.

As shown in FIG. 3, according to some embodiments, the adapter 190 includes: a first body 191 and a second body 192 configured to hold the adult toy 180; a connector 193 disposed on the first body 191 or the second body 192, wherein the connector 193 is detachably connected to the moving rod 170; a spring 194 disposed between the first body 191 and the second body 192; a quick release member 195 configured to pass through the first body 191 and the second body 192, wherein the spring 194 is in a compressed state when the first body 191 and second body 192 are fixed together by the quick release member 195.

In this embodiment, when the adapter 190 is attached to the moving rod 170, the adult toy 180, with or without the connection means to the moving rod 170, can be fixed to the moving rod 170 by the adapter 190. For example, a part of the adult toy 180 can be placed between the first body 191 and the second body 192, and when the first body 191 and the second body 192 are fixed together by the quick release member 195, the adult toy 180 is fixed to the moving rod 170 by the adapter 190. In this case, when the first body 191 and the second body 192 are used to fix the adult toy 180, it will be unnecessary to provide a connection means in the adult toy, and thus the adult toy with any shape or form can be attached to the moving rod 170. Also, when the quick release member 195 is released, the first body 191 and the second body 192 may separate easily with the elastic force of the spring 194. Moreover, the adapter 190 may also hold an extension rod connected to the adult toy 180, to extend the application range of the sexual stimulation apparatus. Also, in an embodiment, the adapter 190 may be used as an extension rod to extend the length of the moving rod 170, i.e., the application range of the sexual stimulation apparatus. It should be noted that FIG. 3 illustrates a particular shape of the adapter 190, while the embodiments of the present disclosure are not limited to this particular shape and structure. For example, the first body 191 and the second body 192 may have other shape such that when they are fixed together, more than one adult toy can be held by the adaptor 190. Also, the adaptor is not limited to the clip shape shown in FIG. 3, and apparently the first body 191 and the second body 192 may have other shape, e.g., a ring shape, that can hold the adult toy.

Figure 4:
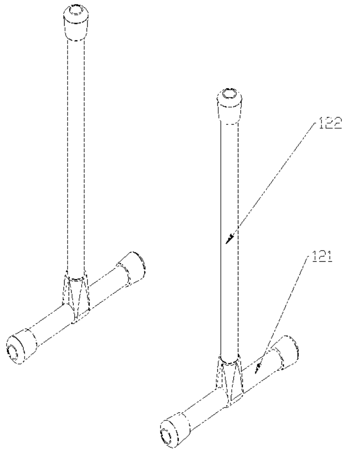
FIG. 4 illustrates a schematic structure diagram of the supporter of the sexual stimulation apparatus according an embodiment of the present disclosure.
Figure 5:
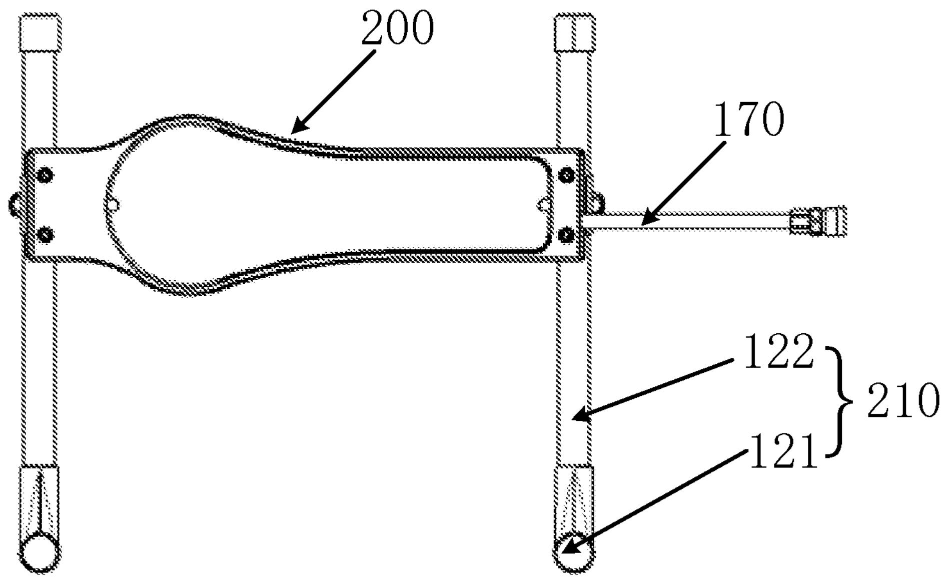
FIG. 5 illustrates a side view of an embodiment of the sexual stimulation apparatus according an embodiment of the present disclosure.
Figure 6:
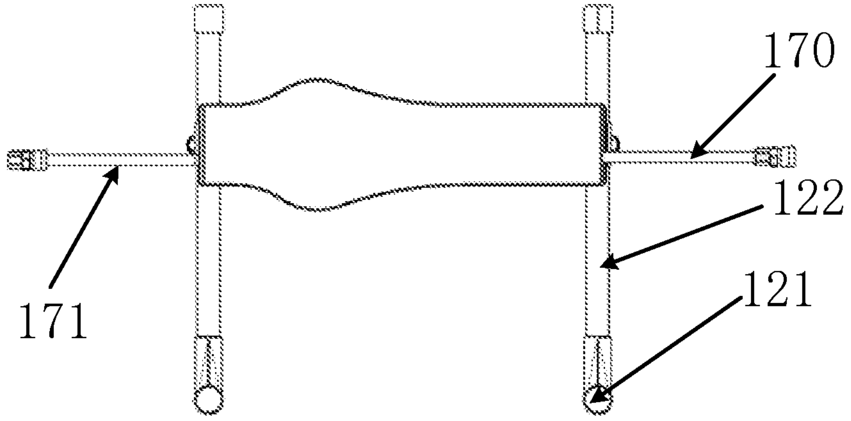
FIG. 6 illustrates another side view of an embodiment of the sexual stimulation apparatus according an embodiment of the present disclosure.

According to some embodiments, as shown in FIGS. 4-6, the sexual stimulation apparatus further includes a housing 200 configured to accommodate the moving component 130 and the sensing stopper component 120. The housing 200 may include a through hole and the moving rod 170 is protruded from the through hole. The housing 200 is disposed on a supporter 210 to stabilize the sexual stimulation apparatus and adjust an orientation of the adult toy 180.

In this embodiment, as shown in FIG. 4, the supporter 210 may include at least two feet 121 and at least two legs 122, wherein the foot 121 may be disposed on a surface such as a table, a floor, a bed or the like, and by providing at least two feet 121, the sexual stimulation apparatus can be placed stably on the surface. Also, the leg 122 is fixed to the foot 121 and may extend upward from the foot 121. The housing 200 may be attached to the at least two legs at a certain height such that the moving rod 170 and the sex toy 180 can be held at a desired position from the surface.

FIG. 5 illustrates a sexual stimulation apparatus having one moving rod 170 and FIG. 6 illustrates a sexual stimulation apparatus having both the moving rod 170 and the opposite moving rod 171. By providing the opposite moving rod 171, another adult toy 180 can be fixed to the opposite moving rod 171, and therefore two users may use the sexual stimulation apparatus at the same time, thereby improving the fun and interactivity of the sexual stimulation apparatus. As an example, the moving rod 170 and the opposite moving rod 171 may both be connected to the same type of adult toy, such as each being connected to a dildo, or each being connected to a masturbation toy. Also, in another example, the moving rod 170 and the opposite moving rod 171 may respectively connected to a different type of adult toy, such as one being connected to a dildo while the other one being connected to a masturbation toy.

Figure 7:
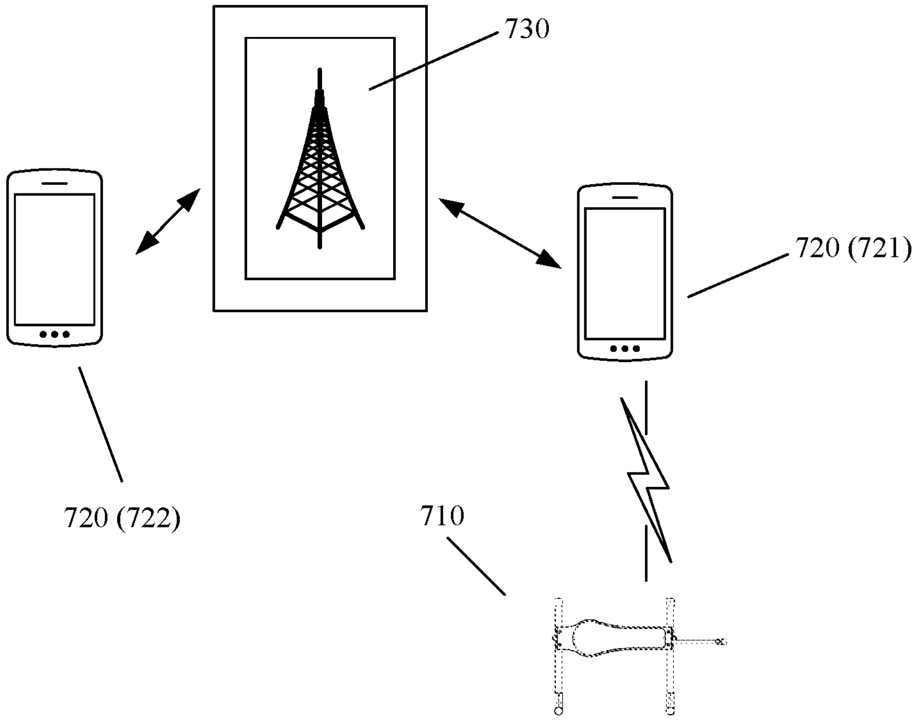
FIG. 7 illustrates a schematic block diagram of the communication system according to an example of the present disclosure.

FIG. 7 illustrates a schematic block diagram of the communication system according to an example of the present disclosure. As shown in FIG. 7, the communication system including: the sexual stimulation apparatus 710 according to the above embodiments, configured to receive a control signal; and at least one communication device 720 communicated with the sexual stimulation apparatus 710 to transmit the control signal, wherein the sexual stimulation apparatus 710 is configured to operate according to the control signal.

In some embodiments, the communication system may include a live broadcast room 730, wherein the at least one communication device 720 includes a model device 721 and a guest device 722 configured to interact through the live broadcast room 730, and wherein the guest device 722 is configured to send control request to the model device 721 through the live broadcast room 730, and the model device 721 is configured to transmit the control signal to the sexual stimulation apparatus 710.

According to the present embodiment, the user of the guest device 722, i.e., the guest, may access to the live broadcast room 730 when the model using the model device 720 is performing in the live broadcast room 730. The guest may interact with the model through the live broadcast room 730, by for example chatting, or other broadcast room functions such as subscribing, following, like (thumbs-up), donating or the like. The interacting information may be transmitted to the model device 721, and the model device 720 may transmit corresponding control signal the sexual stimulation apparatus 710, to control the operation of the sexual stimulation apparatus 710.

In some embodiments, the interacting may involve donating. That is, the guest may make a donation (i.e., give a tip) to the model through the live broadcast room 730, and the live broadcast room 730 may receive the tip information from the guest device 722 and forward the tip information to the model device 721. The model device 721 may generate the control signal according to the tip information. For example, according to different tip information, different control signal may be generated to control the operating status, such as the shock frequency, intensity, amplitude, duration and the like of the sexual stimulation apparatus. Also, the control pattern for the operating status according to the tip information can be predetermined by the model.

In this case, by using the communication system, the sexual stimulation apparatus can be operated with more fun and interactivity when the model and the guest are interacting through the live broadcast room 730.

Figure 8:
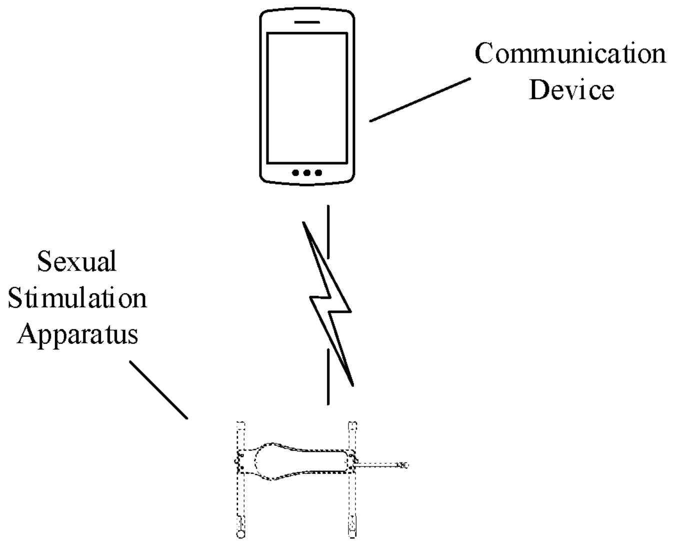
FIG. 8 illustrates a scenario of a method for controlling the sexual stimulation apparatus according to an example of the present disclosure.

FIG. 8 illustrates a scenario of a method for controlling the sexual stimulation apparatus according to an example of the present disclosure. As shown in FIG. 8, the scenario of a method for controlling the sexual stimulation apparatus includes a communication device and the sexual stimulation apparatus. The method for controller the sexual stimulation apparatus may include: activating a communication between the sexual stimulation apparatus and a communication device; receiving, by the sexual stimulation apparatus, control signal from the communication device; and controlling, by the sexual stimulation apparatus, the moving component to perform linear reciprocating motion to drive the adult toy to perform linear reciprocating motion. In some embodiments, the control signal includes frequency information and amplitude information, and the method may further include: controlling, by the sexual stimulation apparatus, the moving component to perform linear reciprocating motion according to the frequency information and amplitude information.

According to the present embodiment, the operating of the sexual stimulation apparatus can be controlled according to the control signal from the communication device, therefore while using the sexual stimulation apparatus, the user will not be required to operate the sexual stimulation apparatus manually, and thus the sexual stimulation apparatus can be operated in a more effective way. Further, the communication device may be implemented by for example the model device according to the above embodiments, and therefore the model may use the sexual stimulation apparatus according to the interacting with the guest through the live broadcast room, thereby improving the fun and interactivity of the sexual stimulation apparatus.

It should be appreciated that, the above embodiments are exemplary implementations for illustrating the principle of the present disclosure only, while the present disclosure is not limited thereto. Various modifications and improvements are possible to those of ordinary skill in the art without departing from the spirit and essence of the present disclosure. All these modifications and improvements will also fall into the protection scope of the present disclosure.

What is claimed is:

1. A sexual stimulation apparatus comprising:
- a chassis comprising a sensing stopper component;
- a moving component moveable relative to the chassis and having a sensing element;
- a controller configured to receive signals generated when the sensing element enters a sensing range of the sensing stopper component, and generate a drive signal;
- a driver configured to drive the moving component to perform linear reciprocating motion according to the drive signal; and
- a moving rod connected to the moving component and is configured to move with the moving component,
- wherein the moving rod comprises an end to which an adult toy is attachable, to allow the adult toy to perform linear reciprocating motion with the moving rod.

2. The sexual stimulation apparatus according to claim 1, wherein the moving component comprises:
- a rotating component connected to the driver and configured to rotate according to the driver; and
- a sliding component, engaged to the rotating component and configured to perform linear movement when the rotating component is rotated,
- wherein the moving rod is connected to the sliding component, and the sensing element is disposed on the sliding component.

3. The sexual stimulation apparatus according to claim 2, wherein:
- the rotating component comprises a driver fixing seat, a screw rod and a screw rod fixing seat arranged in sequence along a longitudinal direction of the chassis,
- wherein the driver is disposed on a first side of the driver fixing seat, and the screw rod and the screw rod fixing seat are disposed on a second side of the driver fixing seat opposite to the first side,
- wherein a first end of the screw rod is rotatably connected with the driver, and a second end of the screw rod is rotatably connected with the screw rod fixing seat, and
- wherein the sliding component is engaged to the screw rod.

4. The sexual stimulation apparatus according to claim 3, wherein the sliding component comprises:
- a screw sleeve engaged to the screw rod; and
- a sensing plate attached to the screw sleeve,
- wherein the sensing element is disposed on the sensing plate at a side opposite to the sensing stopper component, and
- wherein the sensing plate is connected to the moving rod.

5. The sexual stimulation apparatus according to claim 4, wherein the sliding component comprises:
- a guide fixing seat disposed on the chassis;
- a guide rod fixed to the guide fixing seat and extended along the longitudinal direction; and
- a slider sleeved to the guide rod and moveable along the guide rod,
- wherein, the sensing plate is fixed to the slider, and the moving rod is connected to the slider.

6. The sexual stimulation apparatus according to claim 5, wherein the sensing plate comprises a connecting fin extending in parallel with a moving plane of the slider, and wherein the sensing plate is attached to the slider by the connecting fin.

7. The sexual stimulation apparatus according to claim 5, wherein the sensing plate comprises a sensing fin extending in parallel with the sensing stopper component, and wherein the sensing element is disposed on a side of the sensing fin opposite to the sensing stopper component.

8. The sexual stimulation apparatus according to claim 5, wherein the guide fixing seat comprises a through hole extending along the longitudinal direction, and wherein the moving rod is configured to pass through the through hole.

9. The sexual stimulation apparatus according to claim 5, further comprising an opposite moving rod, the opposite moving rod is connected to the slider at a side opposite to the moving rod.

10. The sexual stimulation apparatus according to claim 4, wherein the chassis comprises a limit structure having a through hole, and the moving rod is configured to pass through the through hole.

11. The sexual stimulation apparatus according to claim 1, wherein the sensing stopper component comprises at least two sensing switches configured to limit a stroke of the moving component, and wherein the at least two sensing switches are integrated or separated.

12. The sexual stimulation apparatus according to claim 11, wherein the sensing stopper component further comprises a switch seat, and wherein each of the at least two sensing switches is disposed on a side of the switch seat opposite to the sensing element.

13. The sexual stimulation apparatus according to claim 1, further comprising an adapter connected to the moving rod, wherein the adult toy is connected to the adapter.

14. The sexual stimulation apparatus according to claim 13, wherein the adapter comprises:
- a first body and a second body configured to hold the adult toy;
- a connector disposed on the first body or the second body, wherein the connector is detachably connected to the moving rod;

a spring disposed between the first body and the second body;

a quick release member configured to pass through the first body and the second body, wherein the spring is in a compressed state when the first body and second body are fixed together by the quick release member.

15. The sexual stimulation apparatus according to claim 1, further comprising a housing configured to accommodate the moving component and the sensing stopper component, wherein the housing comprises a through hole and the moving rod is protruded from the through hole, and wherein the housing is disposed on a supporter to stabilize the sexual stimulation apparatus and adjust an orientation of the adult toy.

16. A communication system comprising:

the sexual stimulation apparatus according to claim 1, configured to receive a control signal; and at least one communication device communicated with the sexual stimulation apparatus to transmit the control signal, wherein the sexual stimulation apparatus is configured to operate according to the control signal.

17. The communication system according to claim 16, further comprising a live broadcast room, wherein the at least one communication device comprises a model device and a guest device configured to interact through the live broadcast room, and wherein the guest device is configured to send a control request to the model device through the live broadcast room, and the model device is configured to transmit the control signal to the sexual stimulation apparatus.

18. The communication system according to claim 17, wherein the live broadcast room is configured to receive tip information from the guest device and forward the tip information to the model device, and wherein the model device is further configured to generate the control signal according to the tip information.

19. A method for controlling the sexual stimulation apparatus according to claim 1, comprising:

activating a communication between the sexual stimulation apparatus and a communication device;

receiving, by the sexual stimulation apparatus, a control signal from the communication device; and controlling, by the sexual stimulation apparatus, the moving component to perform the linear reciprocating motion to drive the adult toy to perform the linear reciprocating motion.

20. The method according to claim 19, wherein the control signal comprises frequency information and amplitude information, and the method further comprises:

controlling, by the sexual stimulation apparatus, the moving component to perform the linear reciprocating motion according to the frequency information and amplitude information.

* * * * *